Nov. 19, 1968          J. H. HOPPER          3,411,230
              FISHING POLE HANDLE AND REEL
Filed Oct. 21, 1965                    2 Sheets-Sheet 1
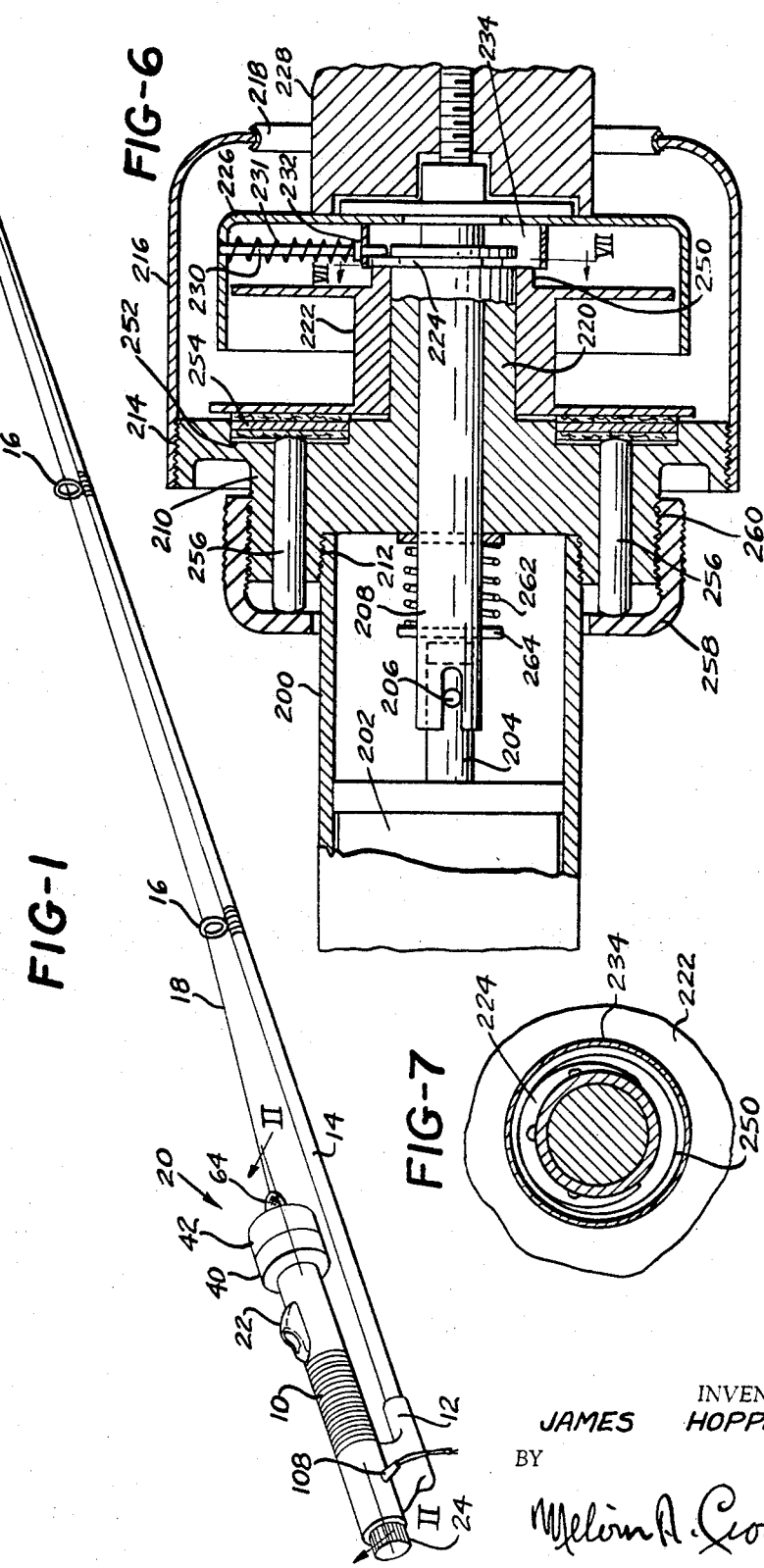
INVENTOR.
JAMES HOPPER
BY
Melvin A. Crosley

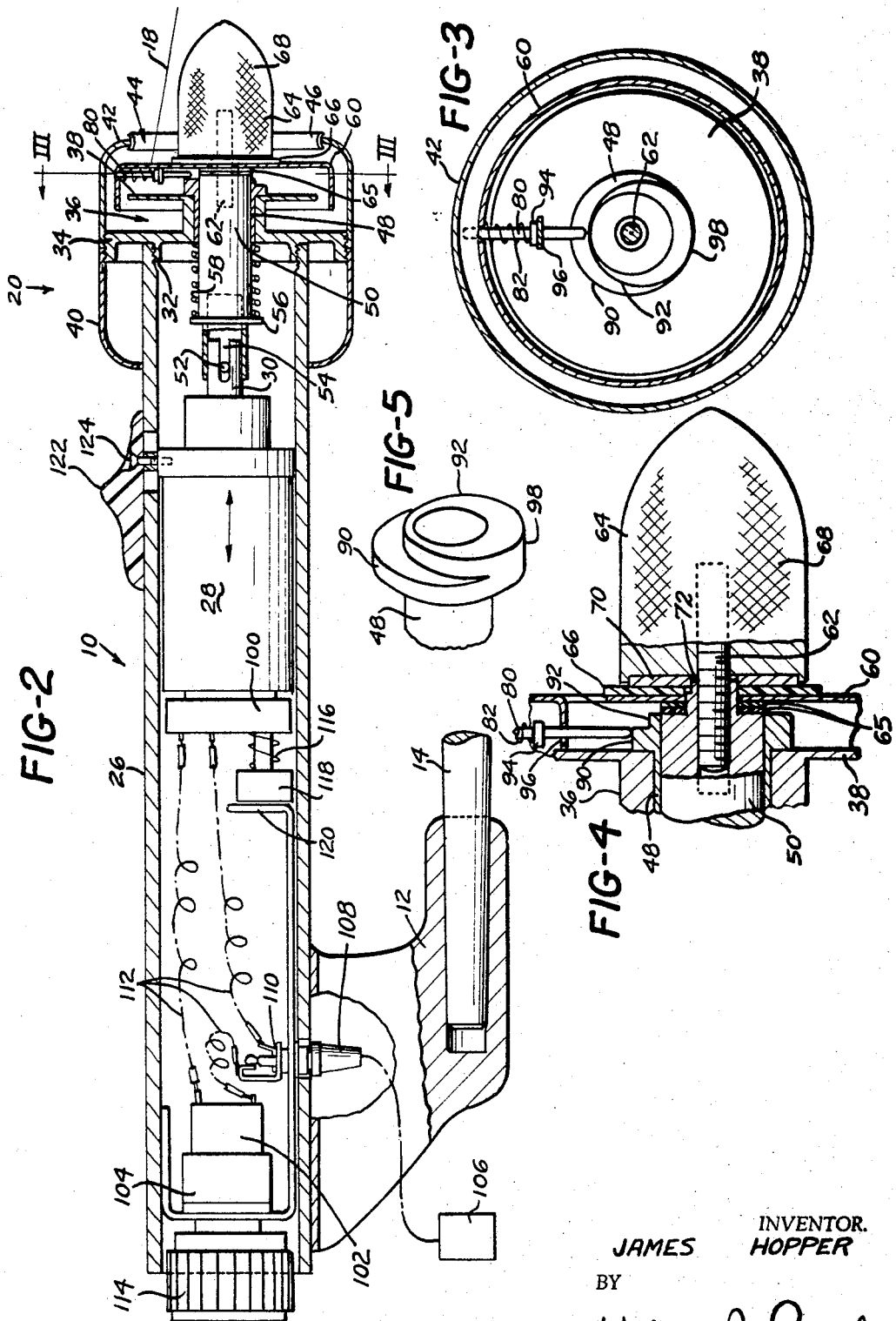

United States Patent Office 3,411,230
Patented Nov. 19, 1968

3,411,230
FISHING POLE HANDLE AND REEL
James H. Hopper, 1 Taylor Road,
Hazardville, Conn. 06036
Filed Oct. 21, 1965, Ser. No. 499,605
7 Claims. (Cl. 43—21)

ABSTRACT OF THE DISCLOSURE

A spinning reel and a fishing rod having an electric drive motor in the rod handle wherein the motor is reciprocable in the handle. When the motor is moved in one direction it moves a drive shaft to retract a pin which releases the line for spin casting and when moved in the other direction it energizes the motor while simultaneously moving the drive shaft to extend the pin into condition to reel in the line.

---

This invention relates to fishing reels and in particular to spinning type fishing reels and to a supporting handle therefor and a drive arrangement for the reel.

Fishing reels are, of course, well known and spinning reels are well known and also handles for supporting the reels are known. The present invention however, proposes the provision of a greatly improved reel structure and handle structure therefor together with a drive motor for the reel in the handle and improved control means for controlling the operation of the drive motor.

The present invention proposes the provision of a novel spinning reel structure which is relatively simple and inexpensive to manufacture and which can readily be assembled for access to the parts thereof but which nevertheless has extremely long life and it is highly efficient in operation.

The present invention furthermore proposes the provision of an electric motor drive arrangement for such a reel which has greatly improved operation and which has a novel control arrangement associated therewith for changing the reel to spinning when a lure is to be cast and then to reeling in when the lure is to be drawn back to the reel. Furthermore, the present invention proposes the provision of an improved relatively simple device for applying drag to the reel to obtain the resistance to movement thereof desired during fishing. The present invention also proposes the provision of an arrangement for readily controlling the speed of the electric drive motor of the reel to meet the requirements of the individual fisherman.

The several features and advantages of the present invention will become more apparent upon reference to the following detailed specification taken in connection with the accompanying drawings in which;

FIGURE 1 is a perspective view showing a fishing reel and supporting handle according to the present invention with a pole attached to the handle.

FIGURE 2 is a vertical longitudinal section through the reel and handle structure and is indicated by line II—II on FIGURE 1.

FIGURE 3 is a sectional view drawn at somewhat enlarged scale as indicated by line III—III on FIGURE 2.

FIGURE 4 is a fragmentary view drawn at enlarged scale showing the drag arrangement for the rotatable part of the reel and also showing a cam associated with the reel.

FIGURE 5 is a perspective view showing a combined bushing and cam forming a part of the reel structure.

FIGURE 6 is a sectional view drawn at enlarged scale showing a modified form which the reel structure can take and, FIGURE 7 is a sectional view indicated by line VII—VII on FIGURE 6 showing a combination cam and snap ring pertaining to the reel.

Referring to the drawings somewhat more in detail, in FIGURE 1, 10 designates a reel handle which carries a member 12 forming a socket for receiving a pole 14. Pole 14 has eyes 16 thereon through which line 18 extends from reel structure 20 mounted on the end of handle 10. Handle 10 includes a button 22 for manipulation of the reel and at the extreme rear end is a rotary knob 24 forming a portion of a rheostat or combined rheostat and switch.

The details of construction of the handle and reel will be more clearly seen in FIGURES 2 through 5, wherein it will be seen that the handle 10 comprises a tubular member 26 which may, for example, be aluminum. Mounted within the handle member is an electric motor 28 having a slotted output shaft 30. Electric motor 28 includes at the output end reduction gearing, such as planetary gearing so that shaft 30 will rotate at a relatively low or a relatively high speed of rotation of motor 28. Motor 28 is preferably of the permanent magnet type and can run for a prolonged period from a dry cell of a size that can easily be carried by the person operating the reel.

At the front end of handle 10, tubular member 26 is provided with internal threads which engage the threads on the outside of a flange 32 projecting from a plate like member 34 forming a part of the reel structure. By this connection between the handle and the reel the reel structure can readily be removed from the handle at any time for servicing or repair or to replace the reel with another of a different size. Member 34 forms a part of the spool of the reel and to this end, on the side opposite flange 32 is provided with a line receiving groove 36 mounted toward the front of the reel by the relatively thin radial flange 38. Member 34 is also threaded about its outer periphery and threadedly receives two relatively thin sheet metal cups 40 and 42. Cup 40 extends backwardly and inwardly and fits relatively closely around the handle structure whereas member 42 extends forwardly and somewhat inwardly and has a larger opening 44 therein than member 40. Opening 44 is the opening through which the line 18 extends and is preferably provided with an arcuate annular wear resistant liner member 46. This member may, for example, be metal with a hard chrome coating thereon.

The member 34 is centrally bored and has mounted therein a bushing 48 that rotatably receives the reel shaft 50. Reel shaft 50 at its left end, as viewed in FIGURE 2, is hollow and reciprocably receives slotted drive shaft 30 of motor 28. A pin 52 in shaft 50 extends slidably into slot 54 in shaft 30 and thus the two shafts are drivingly interconnected while at the same time reciprocation of the shafts relatively is permitted.

Shaft 50 has a pin or collar thereon at 56 and bearing between this pin or collar and the back of member 34 is a compression spring 58 that continuously biases shaft 50 and the parts connected thereto in the leftward direction. On the right side of member 34 as viewed in FIGURE 2, the shaft 50 carries the cup-shaped drum member 60 which has its peripheral axial portion extending inwardly to overlapping relation with thin flange 38 at the first side of line-receiving groove 36. The radial central portion of cup-shaped member 60 is apertured to receive screw portion 62 carried by a control knob 64 which extends outwardly through opening 44 in member 42.

As will best be seen in FIGURE 4, the end of shaft 50 is stepped down and between shaft 50 and the planar portion of member 60 are washers 65 which may be of Teflon or some similar material. On the opposite side of the said planar portion is another washer 66 which may be of Teflon or a similar material and the planar portion of member 60 is clamped between these discs by adjustment of control knob 64. Control knob 64 has a knurled region 68 thereon for the purpose of rotating it to tighten or loosen the gripping of planar portion of member 60 between the said washers.

To prevent any change in the drag as member 60 rotates on shaft 50, there is a metal washer 70 nonrotatably mounted on the end of the shaft, as by the key portion 72 of the shaft. Washer 70 is positioned between washer 66 and control member 64. The reduction gearing connecting output shaft 30 of the motor to the rotary armature of the motor will hold shaft 50 when the motor is deenergized to permit full adjustment of control member 64 up to as tight as the member 60 is to be clamped to the shaft.

Immediately inside the planar wall 60 is a rod-like pin 80 spring urged by spring 82 in the inward direction. In FIGURE 2 this pin is disposed in front of the right end of bushing 48 and is thus urged to its innermost position by spring 82. In this position the outer end of the pin does not project outwardly from the axial flange of coupling member 60 and any line on the spool is thus free to run off and a lure or the like on the outer end of the line can be cast great distances. In FIGURE 4, on the other hand, the inner end of pin 80 is on a larger diameter of the cam portion on the end of bushing 48 and is thus thrust outwardly of the axial portion of member 60 and this will prevent a line from running off the spool and, if the member 60 is caused to rotate the line will, instead, be wound upon the said spool.

Referring to the said cam portion on the end of bushing 48 this will be seen in FIGURES 3, 4 and 5 wherein bushing 48 will be seen to terminate toward the right of member 34 in a larger portion 90 concentric with bushing 48 and a smaller portion 92 eccentric to bushing 48. As will be seen in FIGURE 3, when pin 80 is in its innermost position, as determined by collar 94 on the pin and tab 96 turned out from member 60, the innermost end of the pin is in such position that it will engage over the part of portion 92 which is nearest the axis of rotation of the shaft 50. Thus, by rotation of the shaft the pin will be caused to move about the periphery of portion 92 of the cam and when it reaches the region indicated at 98, where the cam surfaces of the portions 90 and 92 are the same radial distance from the axis of rotation of shaft 50, the pin can be moved back on to the larger diameter portion 90 of the cam.

Spring 58 in biasing the shaft 50 leftwardly together with the parts connected thereto will effect this movement of the pin onto portion 90 of the cam.

As to motor 28, it is provided with an on and off switch 100 and connected in the circuit with motor 28 and on and off switch 100 is an adjustable rheostat 102. Rheostat 102 may also include a switch section 104 if desired although this is not necessary. Power for operating the motor is supplied by a battery 106 which is connected to the handle structure by a plug 108 which fits into a jack 110. The several wires 112 somewhat schematically indicated in the drawings will connect the battery leads with the rheostat and the switch section 104 thereof, the motor switch 100 and the motor 28 in series.

Adjustment of the rheostat can be affected by the knob 114 projecting out the back end of the handle by rotation of the knob and switch structure 104, when it is employed, can be opened and closed by axial movement of the same knob.

The switch 100 which is preferably mounted directly on the motor is normally biased open by a spring 116 acting on the knob 118 of the switch. This knob is positioned closely adjacent a stop member 120 which may, for convenience of manufacture and assembly, be a portion of a metal frame carrying the aforementioned rheostat and associated switch structure. In its normal position, which is determined by spring 116, the motor is so located that switch 100 is open. The motor, however, can be moved axially in the handle structure to close switch 100 and thereby to effect energization of the motor which will cause it to rotate and to drive its shaft 30.

This axial movement of the motor is affected by a thumb knob 122 on the outside of the housing which is connected by screw means 124 with the motor. This same knob is also used for moving the shaft 50 so that pin 80 will drop inwardly and free the line when a cast is to be made. Thus, in operation, assuming the line to be wound up in the spool region of member 34 and to be held therein by pin 80 projecting outwardly from the peripheral member 60, the line can be freed for making a cast by moving thumb button 122 forwardly on the handle. This will move the pin 82 to the extreme front end of the cam portion of bushing 48 and it will drop inwardly into its FIGURE 2 position and the line can freely run off the reel.

When it is desired to return line to the reel, thumb button 122 is merely moved backwardly along the handle structure and this will move the motor backwardly and cause closing of switch 100. This will energize the motor and shafts 30 and 50 will commence to rotate and, as explained before, pin 80 will be moved outwardly and will catch the line and commence to wind it up about the spool region of member 34. The speed of rotation of member 60 is adjustable by the rheostat 102 by means of knob 114. The drag on member 60 to control the pulling off of line when a fish is hooked, is readily effected by adjustment of control member 64 which is available from the front of the reel.

FIGURES 6 and 7 show a modification which is essentially the same as the one previously described except that in this second modification the spool on which the line is reeled up is rotatable and it is to this member that the drag is applied for resisting pulling off of the line when a fish is hooked.

In FIGURES 6 and 7, 200 represents the tubular handle which may be the same as the one described in connection with the first modification. Motor 202 of the same type as previously described is contained within the handle and it includes an output shaft 204 having a slotted axially displaceable connection at 206 with input shaft 208 of the reel structure. The reel structure comprises a stationary member 210 having a threaded connection at 212 to the end of the handle. Member 210 has external threads at 214 that detachably receive the enclosing cup-like member 216. Member 216 has a front opening through which the line pays off from the reel and is taken up into the reel and which opening is surrounded by the hard surfaced ring member 218.

Member 210 comprises an axial hub region 220 on which is rotatably mounted a spool 222. The spool is retained on the hub member by snap ring 224 and shaft 208 extends completely through the hub member and at its outer end carries the cup-like line control member 226 which is fixedly connected to the shaft. A nose piece 228 corresponding in shape to control member 64 is preferably mounted on the extreme outer end of shaft 208 but does not serve as a control member similar to member 64 of the first modification.

A radially movable pin 230 is provided in cup-like control member 226 and is spring-urged inwardly by spring 231 which bears against collar 232 on the pin. The inner end of the pin extends radially through a sleeve 234 carried on the inside of the line control member 226 and in telescoping relation with a boss formed on the front end of spool 222.

The pin 230, similarly to pin 80 of the first-mentioned modification has a radially inner and a radially outer position and is moved between these two positions by a cam which is also the snap ring 224. As will be seen in FIGURE 7 snap ring 224 is crescent shaped and thus provides a cam surface on which pin 230 will ride so it can then engage the aforementioned boss 250 on the end of spool 222.

Immediately behind spool 222 member 210 is provided with an annular recess 252 and mounted within the recess are washer means 254 for frictionally engaging the back of the spool. These washers might comprise any suitable material such as Teflon, or other synthetic material or may comprise, as shown, a combination of two felt washers and a steel washer therebetween. For pressing the washers against the back of the spool two or more pins 256 are provided extending axially through member 210. Pressure can be applied to these pins by cap 258 threaded at 260 to member 210. This cap is knurled and is readily available from the back of the reel for exerting the desired pressure on pins 256 to obtain the drag required on spool 222. The operation of the reel of FIGURES 6 and 7 is the same as that described in connection with the first modification, namely, when the motor 202 is pushed forwardly pin 230 will snap inwardly and when motor 202 is moved backwardly a switch is closed to energize the motor which commences rotation of the cup-like line control member 226 which will cause pin 230 to ride up on the cam provided therefor. When pin 230 reaches the maximum diameter of the cam, spring 262 bearing between the back of member 210 and pin 264 on shaft 208 will move the shaft and the said line control member 226 together with pin 230 backwardly so that the pin will remain in its radially outer position during continued rotation of the line control member.

The principle difference between the modification of FIGURES 6 and 7 and the first described modification is that, when a fish is hooked and starts to take line, instead of line control member 226 turning against controlled friction, this member will remain stationary with pin 230 holding the line, and spool 222, instead, will rotate against the drag of the washers 254 pressing against the back thereof. Both of the modifications described are basically the same and it will be understood that in connection with either thereof, either one or both of the spool portion and the cup-like line control member could be caused to be driven or to rotate under tension when line is being drawn out by a fish.

What is claimed is:

1. In a fishing reel; a frame, a spool member fixed to one side of the frame and having a circumferential groove to receive line, a cup member opening toward said spool coaxial therewith and having a peripheral axial flange overlapping the one end of the spool which is remote from the frame, a radial pin in said cup member spring urged toward an inner position of no projection beyond the cup member and movable into an outer position of projection beyond the cup member, an eccentric cam stationarily mounted at said one end of the spool and operable upon rotation of said cup member to move the pin to its outer position and to hold the pin in that position, drive means in the frame for driving said cup member in rotation whereby said pin will be moved to its outer position by said cam and line leading to said spool member over the periphery of said cup member will be wound on said spool member, means for moving said cup member in a direction away from said cam to release the pin from the cam, whereby the line is released for being spun off the spool member, said drive means comprising a reel input shaft extending axially through said frame and rotatable and reciprocable therein and connected to said cup member, and a spring acting between said frame and said input shaft for biasing said cup member axially toward said cam while permitting movement of the cup member axially away from said cam by axial movement of said input shaft, and a cup-like housing member carried by said frame and enclosing said spool member and cup member and having an aperture therein coaxial with the cup member and spool member and smaller in diameter than the cup member and located in spaced relation to the cup member on the side thereof opposite the spool member for the passage of line to and from the reel, and in combination therewith, a tubular handle connected to said frame on the side thereof opposite said spool member, and coaxial with the spool member, an electric motor in the handle having a reduced speed output shaft drivingly connected to said reel input shaft, said motor being reciprocable in said handle, and a thumb piece on the handle connected to said motor for moving the motor in the handle to effect the said axial movement of the input shaft and cup member to release said pin from said cam.

2. The combination according to claim 1 in which an adjustable rheostat is mounted in the handle and connected in series with the switch and motor for controlling the speed of the motor.

3. The combination according to claim 1 in which an adjustable rheostat is mounted in the handle and connected in series with the switch and motor for controlling the speed of the motor, said rheostat comprising a control knob projecting from the end of the handle opposite its connection to said frame.

4. The combination according to claim 3 in which said rheostat is mounted in a bracket insertable into said handle, said bracket having an abutment adjacent said motor, said switch being mounted on the end of said motor adjacent said bracket and having an operating element spring biased away from the switch which engages the abutment for closing the switch when the motor is moved away from said frame.

5. In a fishing reel; a frame, a spool member fixed to one side of the frame and having a circumferential groove to receive line, a cup member opening toward said spool coaxial therewith and having a peripheral axial flange overlapping the one end of the spool which is remote from the frame, a radial pin in said cup member spring urged toward an inner position of no projection beyond the cup member and movable into an outer position of projection beyond the cup member, an eccentric cam stationarily mounted at said one end of the spool and operable upon rotation of said cup member to move the pin to its outer position and to hold the pin in that position, drive means in the frame for driving said cup member in rotation whereby said pin will be moved to its outer position by said cam and line leading to said spool member over the periphery of said cup member will be wound on said spool member, means for moving said cup member in a direction away from said cam to release the pin from the cam, whereby the line is released for being spun off the spool member; said drive means comprises a reel input shaft extending axially through said frame and rotatable and reciprocable therein and connected to said cup member, means frictionally resisting rotation of said cup member on said input shaft, a spring acting between said frame and said input shaft for biasing said cup member axially toward said cam while permitting movement of the cup member axially away from said cam by axial movement of said input shaft, a cup-like housing member carried by said frame and enclosing said spool member and cup member and having an aperture therein coaxial with the cup member and spool member and smaller in diameter than the cup member and located in spaced relation to the cup member on the side thereof opposite the spool member for the passage of line to and from the reel; said means frictionally resisting rotation of the cup member on the input shaft including friction washer means clamped between the cup member and input shaft, screw threaded means on the cup member end of the input shaft for varying the clamping pressure on said washer means and projecting axially through said aperture for access for manual adjustment thereof, a handle connected to said frame, a drive motor in the handle having output means connected to said reel input shaft, said motor being reciprocable in said handle, means responsive to movement of the motor in one direction in said handle for moving said cup member into position to release said pin from said cam, and means responsive to movement of the motor in the other direction in said handle for completing an energizing circuit for said motor.

6. A fishing reel according to claim 1 which includes a non-rotative sliding connection between said output shaft and said reel input shaft such that movement of the motor toward said frame will effect said axial movement of the input shaft and cup member to release said pin from said cam while movement of the motor away from the frame can take place without movement of said input shaft and cup member, a normally open switch in the handle serially connected with said motor, and means operable upon movement of said motor away from said frame for closing said switch.

7. The combination according to claim 1 wherein said handle at the end opposite the connection thereof with said frame includes pole support means, said pole support means comprising a bracket fixed to the handle and having a pole receiving socket therein spaced laterally from the handle and having its axis substantially parallel to that of the handle, said handle having a hand graspable region between said pole supporting bracket and said thumb piece.

References Cited

UNITED STATES PATENTS

| | | | |
|---|---|---|---|
| 2,628,444 | 2/1953 | Oak | 43—20 |
| 3,032,290 | 5/1962 | Wallace | 43—21 X |
| 3,198,456 | 8/1965 | Wood | 242—84.2 |
| 3,248,819 | 5/1966 | Stealy | 43—21 |
| 3,284,018 | 11/1966 | Wood | 242—84.2 |

SAMUEL KOREN, *Primary Examiner.*

D. J. LEACH, *Assistant Examine.*